United States Patent
Fink et al.

(10) Patent No.: US 6,496,935 B1
(45) Date of Patent: Dec. 17, 2002

(54) SYSTEM, DEVICE AND METHOD FOR RAPID PACKET FILTERING AND PROCESSING

(75) Inventors: Gonen Fink, Tel Aviv (IL); Amir Harush, Kiriat-Haim (IL)

(73) Assignee: Check Point Software Technologies LTD, Ramat Gan (IL)

( * ) Notice: Subject to any disclaimer, the term of this patent is extended or adjusted under 35 U.S.C. 154(b) by 0 days.

(21) Appl. No.: 09/517,276

(22) Filed: Mar. 2, 2000

(51) Int. Cl.[7] .......................... G06F 11/30; H01S 3/097
(52) U.S. Cl. ........................ 713/201; 713/200; 709/24; 370/85
(58) Field of Search ................................ 713/200, 201; 709/229, 228, 224, 225; 370/85

(56) References Cited

U.S. PATENT DOCUMENTS

| | | | | |
|---|---|---|---|---|
| 5,400,331 A | * | 3/1995 | Lucak et al. | 370/85.1 |
| 5,648,965 A | * | 7/1997 | Thadani et al. | 370/241 |
| 5,802,320 A | * | 9/1998 | Baher et al. | 395/200.79 |
| 5,828,833 A | * | 10/1998 | Belville et al. | 395/187.01 |
| 5,878,231 A | * | 3/1999 | Baehr et al. | 395/200.75 |
| 5,884,025 A | * | 3/1999 | Baher et al. | 395/187.01 |
| 6,073,178 A | * | 6/2000 | Wong et al. | 709/229 |
| 6,092,108 A | * | 7/2000 | DiPlacido et al. | 709/224 |
| 6,147,976 A | * | 11/2000 | Shand et al. | 370/254 |
| 6,208,651 B1 | * | 3/2001 | Van Renesse et al. | 370/392 |
| 6,304,975 B1 | * | 10/2001 | Shipley | 713/201 |

* cited by examiner

Primary Examiner—Norman M. Wright
(74) Attorney, Agent, or Firm—Mark M. Friedman

(57) ABSTRACT

A system, a device and a method for accelerating packet filtration by supplementing a firewall with a pre-filtering module. The pre-filtering module performs a limited set of actions with regard to the packets, according to whether the packets are received from a connection which has been previously permitted by the firewall. If the packets are received from such a permitted connection, then the pre-filtering module forwards the packets to their destination, optionally performing one or more actions on the packets. Otherwise, the packets are forwarded to the firewall for handling. Preferably, once the firewall has transferred responsibility for the connection to the pre-filtering module, or "off-loaded" the connection, the firewall does not receive further packets from this connection until a timeout occurs for the connection, or a packet is received with particular session-control field values, such that the connection is closed. Optionally and preferably, the pre-filtering module is implemented as hardware.

30 Claims, 3 Drawing Sheets

SYSTEM, DEVICE AND METHOD FOR RAPID PACKET FILTERING AND PROCESSING

FIELD AND BACKGROUND OF THE INVENTION

The present invention is of a system, a device and method for rapid packet filtering on a packet-switched network, and in particular, to such a system, a device and method in which the efficiency of packet filtration is increased by session-based filtering.

Connectivity and security are two conflicting objectives in the computing environment of most organizations. The typical modern computing system is built around network communications, supplying transparent access to a multitude of services. The global availability of these services is perhaps the single most important feature of modern computing solutions. Demand for connectivity comes both from within organizations and from outside them.

Protecting network services from unauthorized usage is of paramount importance to any organization. As the need for increased security grows, the means of controlling access to network resources has become an administrative priority. In order to save cost and maintain productivity, access control must be simple to configure and transparent to users and applications. The minimization of setup costs and down time are also important factors.

Packet filtering is a method which allows connectivity yet provides security by controlling the traffic being passed, thus preventing illegal communication attempts, both within single networks and between connected networks.

U.S. Pat. Nos. 5,835,726 (filed on Jun. 17, 1996) and U.S. Pat. No. 5,606,668 (filed on Dec. 15, 1993), both of which are hereby incorporated by reference as if fully disclosed herein, describe methods for providing network security by controlling the inbound and outbound data packet flow in a computer network. The flow of packets is controlled through packet filtering, performed according to a user-generated rule base which is then converted into a set of filter language instructions. Each rule in the rule base includes a source, destination, service, whether to accept or reject the packet and whether to log, encrypt and/or authenticate the event. The set of filter language instructions are installed and execute on inspection engines which are placed on computers acting as firewalls. The inspection engines perform stateful inspection in order to determine whether a packet should be permitted to enter through the firewall. The firewalls are positioned in the computer network such that all traffic to and from the network to be protected is forced to pass through the firewall. Thus, packets are filtered as they flow into and out of the network in accordance with the rules comprising the rule base.

According to these references, the inspection engine acts as a virtual packet filtering machine which determines on a packet by packet basis whether to reject or accept a packet. If a packet is rejected, it is dropped. If it is accepted, the packet may then be modified. Modification may include encryption, decryption, signature generation, signature verification or address translation. All modifications are performed in accordance with the contents of the rule base.

Unfortunately, one drawback of the disclosed method is that a large computational burden is placed upon the computer which operates the firewall. The previously disclosed processes of packet filtration require each packet to be separately analyzed, with many different comparisons to the set of rules according to which packet entry through the firewall is determined. However, once a session, or connection between two nodes which is established through the firewall, has been validated as permitted, then in most cases, further intensive analysis may not be necessary. Thus, reducing or even eliminating the requirement for continued analysis of packets from a permitted connection would significantly reduce the computational burden imposed by a firewall and accelerate the process of packet filtering, while still maintaining the security of the protected system.

There is thus a need for, and it would be useful to have, a system, a device and a method for rapid packet filtration according to the connection from which a packet is received, such that if a packet is received from a permitted connection, the requirement for complete packet analysis is reduced or even eliminated, while the ability to rapidly and efficiently modify packets is still maintained, optionally through hardware acceleration of the modification process.

SUMMARY OF THE INVENTION

The present invention is of a system, a device, and a method for accelerating packet filtration on a packet-switched network, preferably an IP network, by supplementing a firewall with a pre-filtering module. The pre-filtering module performs a limited set of actions with regard to the packets, according to whether the packets are received from a connection which has been previously permitted by the firewall. If the packets are received from such a permitted connection, then the pre-filtering module forwards the packets to their destination, optionally performing one or more actions on the packets. Otherwise, the packets are forwarded to the firewall for handling. Preferably, once the firewall has transferred responsibility for the connection to the pre-filtering module, or "off-loaded" the connection, the firewall does not receive further packets from this connection until a timeout occurs for the connection, or a packet is received with a particular session-control field value which indicates that the session is finished, such that the connection is closed.

For example, for the preferred implementation of the present invention with IP networks, such a session-control field value is a FIN/RST flag which is set for the packet.

One advantage of reducing or even eliminating the amount of analysis which is required for packets from a permitted connection is that the firewall can optionally be supplemented by hardware acceleration. Such hardware acceleration has the advantage of being much more rapid than software-based packet processing, and can therefore significantly increase the efficiency of the firewall system. In addition, hardware acceleration of the modification process can maintain the ability to rapidly and efficiently modify packets, since the modification process requires less "intelligence" for modifying the packets but faster processing, while the opposite characteristics are true for the process of packet analysis. Thus, optionally and preferably, the pre-filtering module is implemented as hardware.

According to the present invention, there is provided a system for accelerated packet filtering, the system comprising: (a) a source node for transmitting a packet; (b) a destination node for receiving the packet; (c) a firewall interposed between the source node and the destination node for performing packet filtering according to at least one rule; and (d) a pre-filtering module being in communication with the firewall, for receiving at least one instruction from the firewall and for receiving the packet before the firewall, such that if the packet is permitted according to the at least one instruction, the pre-filtering module handles the packet, and alternatively the pre-filtering module forwards the packet to the firewall for handling.

According to another embodiment of the present invention, there is provided a system for accelerated filtering of a packet on a network, the system comprising: (a) a firewall located on the network for performing packet filtering on the packet according to at least one rule; and (b) a pre-filtering module located on the network and in communication with the firewall, for receiving at least one instruction from the firewall, the at least one instruction determining a simple comparison, and for receiving a packet transmitted on the network before the firewall, such that if the packet is permitted according to the simple comparison, the pre-filtering module at least transmits the packet on the network.

According to yet another embodiment of the present invention, there is provided, for use in a system for accelerated packet filtration, the system featuring a network for transmitting a packet and a firewall on the network for filtering the packet, a device for receiving the packet before the firewall, the device comprising: (a) a memory for storing at least one instruction for analyzing at least one parameter of the packet from the firewall, the at least one instruction including the at least one parameter for identifying the packet; and (b) a classification engine for analyzing at least a portion of the packet and for comparing the at least a portion of the packet to the at least one parameter according to the at least one instruction.

According to still another embodiment of the present invention, there is provided a method for accelerated packet filtering on a network in conjunction with a firewall, the method comprising the steps of: (a) providing a pre-filtering module for receiving a packet before the firewall; (b) receiving the packet by the pre-filtering module; (c) determining whether the packet is permitted; and (d) if the packet is permitted, handling the packet by the pre-filtering module.

Hereinafter, the term "network" includes a connection between any two or more computational devices which permits the transmission of data.

Hereinafter, the term "computational device" includes, but is not limited to, personal computers (PC) having an operating system such as Windows™, or Linux; Macintosh™ computers; computers having JAVA™-OS as the operating system; workstations such as the computers of Sun Microsystems™ and Silicon Graphics™, and other computers having some version of the UNIX operating system such as AIX™ or SOLARIS™ of Sun Microsystems™; any other known and available operating system; any type of computer; any device which can be connected to a packet switched network and which has an operating system, including but not limited to VxWorks™ and PSOS™; or any device which can be so connected to a packet switched network, which is capable of transmitting and receiving packets, and which has at least a data processor, such as a network processor for example, including but not limited to, a bridge, a switch or a router. Hereinafter, the term "Windows™" includes but is not limited to Windows NT™, Windows98™, Windows2000™, Windows CE™ and any upgraded versions of these operating systems by Microsoft Corp. (USA).

The method of the present invention could be described as a series of steps performed by a data processor, and as such could optionally be implemented as software, hardware or firmware, or a combination thereof. For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF THE INVENTION

Figure 1:
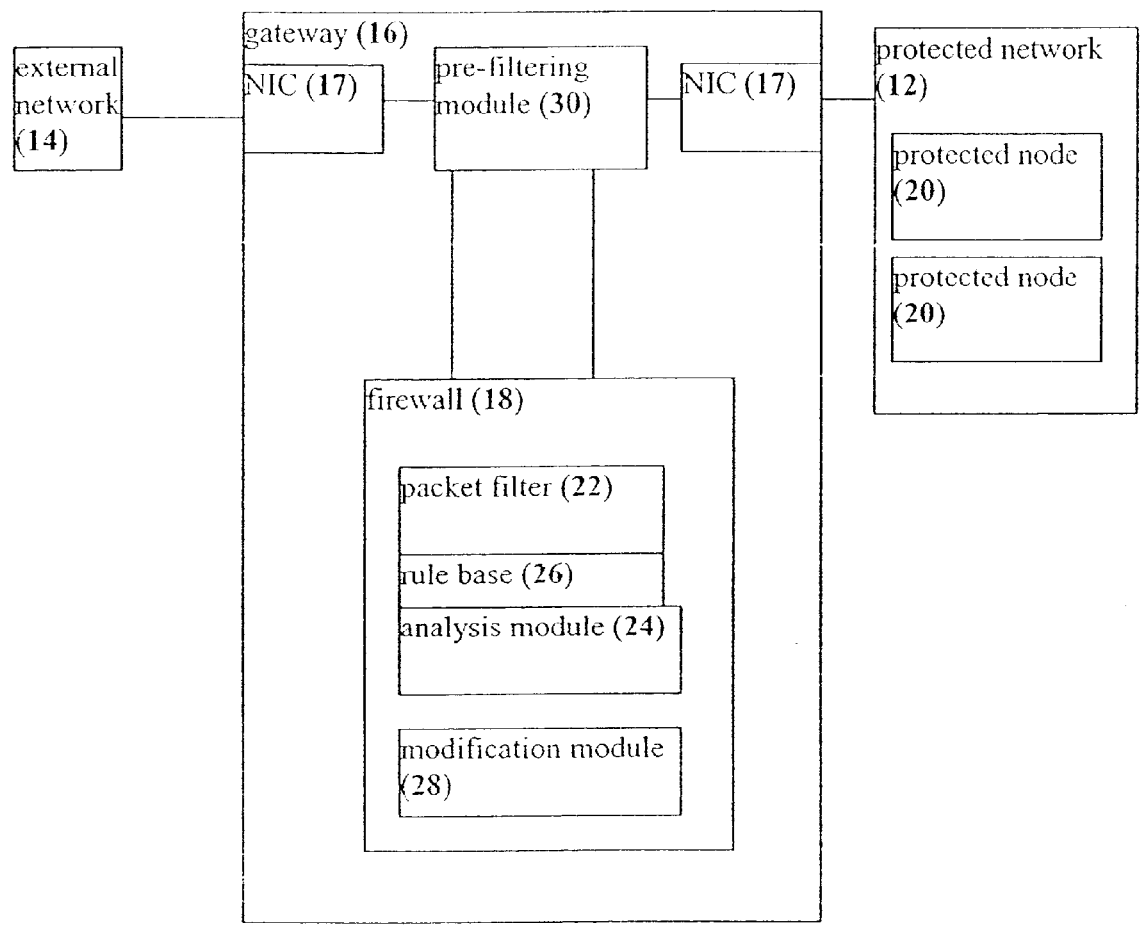
FIG. 1 is a schematic block diagram of a system according to the present invention.

The present invention is of a system, a device and a method for accelerating packet filtration by supplementing a firewall with a pre-filtering module. The pre-filtering module performs a simple comparison with regard to the packets, for example according to whether the packets are received from a connection which has been previously permitted by the firewall. If the packets are received from such a permitted connection, then the pre-filtering module forwards the packets to their destination, optionally performing one or more actions on the packets. Otherwise, the packets are forwarded to the firewall for handling. In addition, preferably packets are forwarded to the firewall for handling if these packets have particular session-control field values which require intervention by the firewall. For example, for the preferred implementation of the present invention with IP networks, and in particular with TCP/IP traffic, such session-control field values include a set SYN/FIN/RST flag for the packet. Such session-control field values are indicative of packets which carry information about the connection state, and are therefore important for the firewall to receive and analyze, in order to determine the state of the connection. Optionally, fragment packets are also forwarded to the firewall if the pre-filtering module is not able to perform certain functions, such as virtual defragmentation for the preferred embodiment of the present invention with IP networks, and in particular with IP traffic.

Once the firewall has determined that a connection is permitted, or has otherwise determined at least one parameter for performing the simple comparison, the firewall preferably sends a message to the pre-filtering module with the details of the new permitted packets. Preferably, once the firewall has transferred responsibility for the connection to the pre-filtering module, or "off-loaded" the connection, the firewall does not receive further packets from this connection until a timeout occurs for the connection, or a packet is received with particular session-control field values indicating that the session is finished, for example by having the FIN/RST flag set for the preferred implementation with IP networks, such that the connection is closed. A "timeout" occurs if a packet has not been received by the firewall for a predefined period of time.

The pre-filtering module is preferably implemented as hardware, in order to take advantage of hardware acceleration. Such hardware acceleration has the advantage of being much more rapid than software-based packet processing. Therefore, the pre-filtering module is preferably implemented as a hardware-based device, although the pre-filtering module could alternatively be implemented as software or firmware. Optionally, the pre-filtering module and the firewall could be implemented as a combined device, which could be a "black box" added to, or alternatively as a replacement for, the gateway node of a network, for ease of installation and operation.

The principles and operation of a system, a device and a method according to the present invention may be better understood with reference to the drawings and the accompanying description, it being understood that these drawings are given for illustrative purposes only and are not meant to be limiting. Although the following description centers around IP networks, and in particular around TCP/IP packet traffic, it is understood that this is for the purposes of illustration only and is not intended to be limiting in any way.

Referring now to the drawings, FIG. 1 is a schematic block diagram of a system according to the present invention. A system 10 features a protected network 12, which is a packet-switched network, such that data is transmitted in the form of packets. Protected network 12 is separated from an external packet-switched network 14 by a gateway 16, which could optionally be any type of computational device, also termed herein an "intermediate node". External network 14 could optionally be the Internet, for example. Gateway 16 is connected to each of external network 14 and protected network 12 through a hardware connector, shown herein as a NIC 17.

Gateway 16 operates a firewall 18 for performing packet analysis and packet filtering. Packets which are permitted to pass through gateway 16 from external network 14 are then received by one of a plurality of protected nodes 20, which are connected to protected network 12. Such network traffic is typically bidirectional, such that packets are received by gateway 16 from protected network 12 for transmission to external network 14 and vice versa.

Firewall 18 is preferably implemented as previously described in U.S. Pat. Nos. 5,835,726 and 5,606,668. Firewall 18 features a packet filter 22 for performing packet filtration. Packet filter 22 in turn is preferably composed of an analysis module 24 for analyzing packets and a rule base 26. Rule base 26 preferably contains one or more rules which are defined according to the preferences of the system administrator or other controlling user. Analysis module 24 extracts and compares the contents of the analyzed packets to the rules in rule base 26. If the result of the comparison is such that the packet is permitted according to rule base 26, then packet filter 22 permits the packet to enter protected network 12.

Alternatively, if the packet is not permitted according to rule base 26, then the packet is optionally dropped. The packet may also optionally be determined to be not permitted if rule base 26 does not specifically allow the packet to be passed.

Also optionally and preferably, packet filter 22 features a modification module 28 for modifying the packet, if the packet is accepted.

Other optional features of firewall 18 include an ability to perform accounting for the packets, in order to determine the amount of data being transferred on all packets which belong to a specific connection; the ability to modify address(es) within the packet; and the ability to encrypt the packets.

Packet encryption in particular has been previously described in U.S. Pat. No. 5,835,726. Briefly, packets can optionally be encrypted for transmission between two firewalls 18, such that the packets are encrypted for passing through external network 14. Encryption is also optionally used for communication between firewall 18 and a node from external network 14, for example. The encrypted packets are then decrypted by the receiving firewall 18, and passed to protected network 12. Thus, the processes of encryption and transmission are automated, and can be performed in a manner which is transparent to the communicating software.

These features of firewall 18 are preferably implemented as previously described in U.S. Pat. Nos. 5,835,726 and 5,606,668. However, passing all packets through firewall 18 before they are allowed to enter gateway 16 places a large computational burden on firewall 18. Therefore, according to the present invention, gateway 16 also features a pre-filtering module 30 which receives the packets before firewall 18, but which is preferably directly connected to protected network 12. Pre-filtering module 30 also preferably receives instructions from firewall 18, concerning packets which are permitted to enter protected network 12. These instructions are more preferably determined by firewall 18 from an analysis of one or more previously received and related packets, such that if a previously received and related packet has been permitted to enter protected network 12, then the current packet should also be permitted to enter protected network 12. Thus, if pre-filtering module 30 determines that the current packet is permitted to enter, then preferably pre-filtering module 30 passes the packet directly through to protected network 12.

In order to increase the efficiency of operation of pre-filtering module 30, preferably pre-filtering module 30 can only perform restricted analysis of each packet. Specifically, more preferably only a portion of each packet is analyzed by pre-filtering module 30. Most preferably, pre-filtering module 30 analyzes each packet only with regard to a simple comparison. By "simple comparison", it is meant that the information is extracted in the form of one or more pre-defined parameters which are compared to a predefined pattern of such parameters.

In a particularly preferred example of a simple comparison, the packet is only analyzed until pre-filtering module 30 is able to determine whether the packet has been received from a permitted data transmission. Such a permitted transmission may be termed a connection, between a source node which initiates the connection, for example from external network 14, to a destination node which accepts the connection, for example a protected node 20. It is understood that once the connection has been established, communication between the source node and destination may optionally be bi-directional.

With regard to packet analysis, a "connection" is defined according to at least one, and preferably a plurality of, parameters which describe the data transmission to which the packet belongs. Examples of these parameters include but are not limited to, the source address and port of the packet; the destination address and port of the packet; the protocol of the packet and the interface from which the packet was received. The connection is used to classify the packet, and to determine whether the packet is permitted to enter to, or to leave from, protected network 12.

Firewall 18 defines each connection from an analysis of one or more previously received and examined packets. Firewall 18 inspects the contents of such packet or packets, and based upon the output of analysis module 24 with rulebase 26, determines whether packets from the corresponding connection should be permitted to enter and/or leave protected network 12. In addition, from the rules which are stored in rule base 26, analysis module 24 is able to determine one or more actions which should be associated with each connection. Examples of such actions include, but are not limited to, performing an accounting action in order to count the amount of data in the packet, encrypting/decrypting the packet, performing network address translation (NAT) by rewriting the address fields, and so forth. A preferred example for modifying the packet is to mark the packet, by assigning a priority number to the packet by pre-filtering module 30, according to the instructions of firewall 18. This priority number determines the order of transmission of the packet, and hence its "priority".

Firewall 18 then passes the relevant instructions concerning at least whether the packet is permitted to enter protected network 12, and more preferably, the actions which should be taken with subsequent packets from this connection, to pre-filtering module 30.

Optionally and preferably, pre-filtering module 30 performs an anti-spoofing method. Since pre-filtering module 30 may optionally be connected to a plurality of networks, packets can come from any one of these networks. The anti-spoofing method determines whether an IP packet, indicated as originating from a certain network, has indeed arrived from that network. As pre-filtering module 30 knows which network is connected to which interface, pre-filtering module 30 can determine whether a packet received from a particular interface is permitted.

The easiest way to implement the anti-spoofing method in an accelerator, such as pre-filtering module 30, is to include information regarding the network interface as part of the connection information which is available to pre-filtering module 30. Thus, if a packet comes from an allowed source node, is to be sent to an allowed destination, and has arrived through the expected interface, the packet can be processed by pre-filtering module 30. Alternatively and optionally, even if only the interface is not correct, pre-filtering module 30 may determine that the packet represents a violation which should be further inspected by firewall 18 for validity. There are other ways to implement an anti-spoofing method, without including information concerning the interface as part of the stored instructions for pre-filtering module 30, which are also considered to be within the scope of the present invention.

Figure 2:
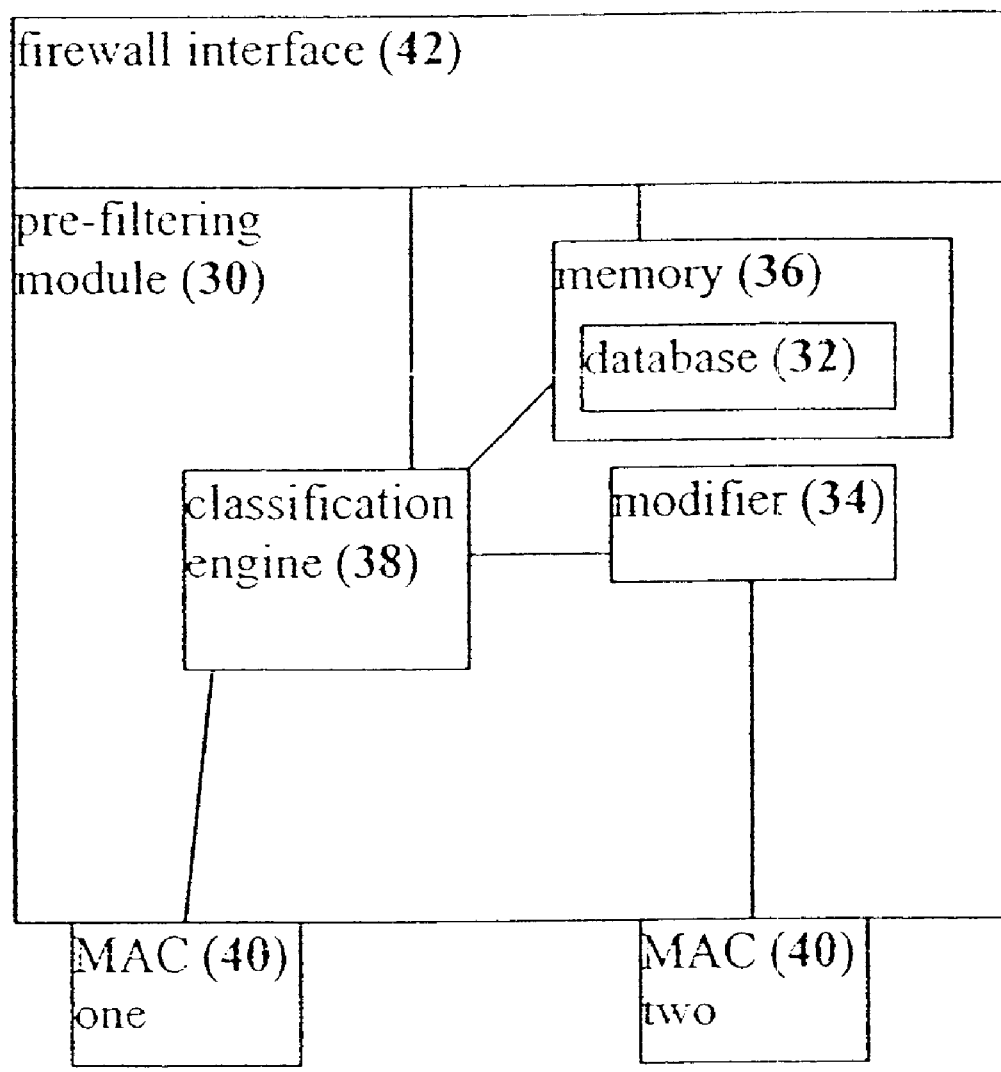
FIG. 2 is a schematic block diagram of an exemplary but preferred embodiment of the pre-filtering module of FIG. 1 according to the present invention.

In a preferred embodiment of pre-filtering module 30 which is shown in FIG. 2, pre-filtering module 30 is embodied in hardware, or at the very least firmware, rather than purely as software. The advantage of hardware is that is is much faster than software for performing the required actions. The schematic block diagram of FIG. 2 is a logic-based, rather than structural, illustration of the components of pre-filtering module 30. For example, the physical connections between components are not specified, and may be for example, a PCI bus on which all of the components are located. Optionally, the components may be connected with substantially any type of internal and/or external bus, for example.

For this implementation, pre-filtering module 30 may be described as a "device", preferably featuring a memory 36. Pre-filtering module 30 features a connection database 32 for storing the relevant instructions from firewall 18, which is stored in memory 36. Connection database 32 stores at least the parameter or parameters of the packet which are required to define the connection, but also preferably stores at least one action to be performed on packets from that connection.

Pre-filtering module 30 also preferably features a classification engine 38, including a data processor, for at least partially analyzing the information from the packet and for retrieving information from connection database 32. Pre-filtering module 30 also preferably features a modifier 34, for performing the associated action or actions for packets from that connection, which is preferably stored in connection database 32 as previously described.

Pre-filtering module 30 also optionally and preferably communicates certain, selected information concerning at least one packet to firewall 18. The selected information optionally includes at least one of, but is not limited to, the previously described parameters for analyzing the packet. The communication between pre-filtering module 30 and firewall 18 is optionally and preferably performed according to one of a number of embodiments. In a first embodiment, pre-filtering module 30 actively notifies firewall 18 upon the receipt of such information, in a state or event driven implementation. Alternatively, in a second embodiment, firewall 18 queries pre-filtering module 30, in a polling implementation. For example, the polling may optionally be performed after a particular interval of time has passed, or alternatively according to a user query for such information, for example from a system administrator.

In addition, pre-filtering module 30 also preferably features at least one, and preferably a plurality of, network interfaces, shown as MAC (media access control) 40, which is hardware for sending and receiving packets from the physical network (not shown). Pre-filtering module 30 more preferably features a firewall interface 42 for transferring packets to, and receiving packets from, the firewall (not shown).

The flow of operations is preferably as follows. Packets are optionally received from MAC 40, labeled "MAC one", which are then passed to classification engine 38. With the help of information and instructions retrieved from database 32 in memory 36, classification engine 38 then analyzes at least a portion of the information in each packet, and determines whether the packet is permitted. If the packet is permitted, then it is passed to modifier 34 for optional modification according to at least one instruction from the firewall (not shown), such that if modification is not necessary, then the at least one relevant instruction is not sent from the firewall.

The firewall may optionally determine an interface to which a packet should be sent, for example to a particular MAC 40. However, it should be noted that although the firewall may instruct pre-filtering module 30 for sending the packet to a particular interface, if routing is supported, then such routing would be used to route the packet, and not the instructions from the firewall (not shown).

Alternatively, the packet may be optionally and preferably forwarded to the firewall. Also alternatively, under certain circumstances as described in greater detail below, the packet may be dropped, particularly with regard to packets received from firewall interface 42, which are optionally similarly analyzed. In order to avoid dropping packets which may not be IP packets, optionally and preferably, information regarding one or more "default" packet types may be stored in database 32, such that if such information is not stored in database 32, the packet is defined as being "not permitted". One example of such a default packet type is an ARP (address resolution protocol) packet.

As can be seen with regard to the implementation of pre-filtering module 30 of FIG. 2, packets may optionally arrive at pre-filtering module 30 from an external source, such as MAC 40 for example, or alternatively may be received from firewall interface 42. If the packet is received from firewall interface 42, it may have been generated by the firewall itself, or alternatively may have been forwarded or generated by the IP stack of the host. Therefore, optionally and more preferably, for such packets which are received through firewall interface 42, pre-filtering module 30 is able to drop such packets if they are not permitted, rather than forwarding them to the firewall. Thus, the determination of whether to drop or forward packets by pre-filtering module 30 is optionally and preferably performed at least partially according to the interface through which the packets are received.

Of course, other implementations of pre-filtering module 30 are possible and are considered to be within the scope of the present invention.

Figure 3:
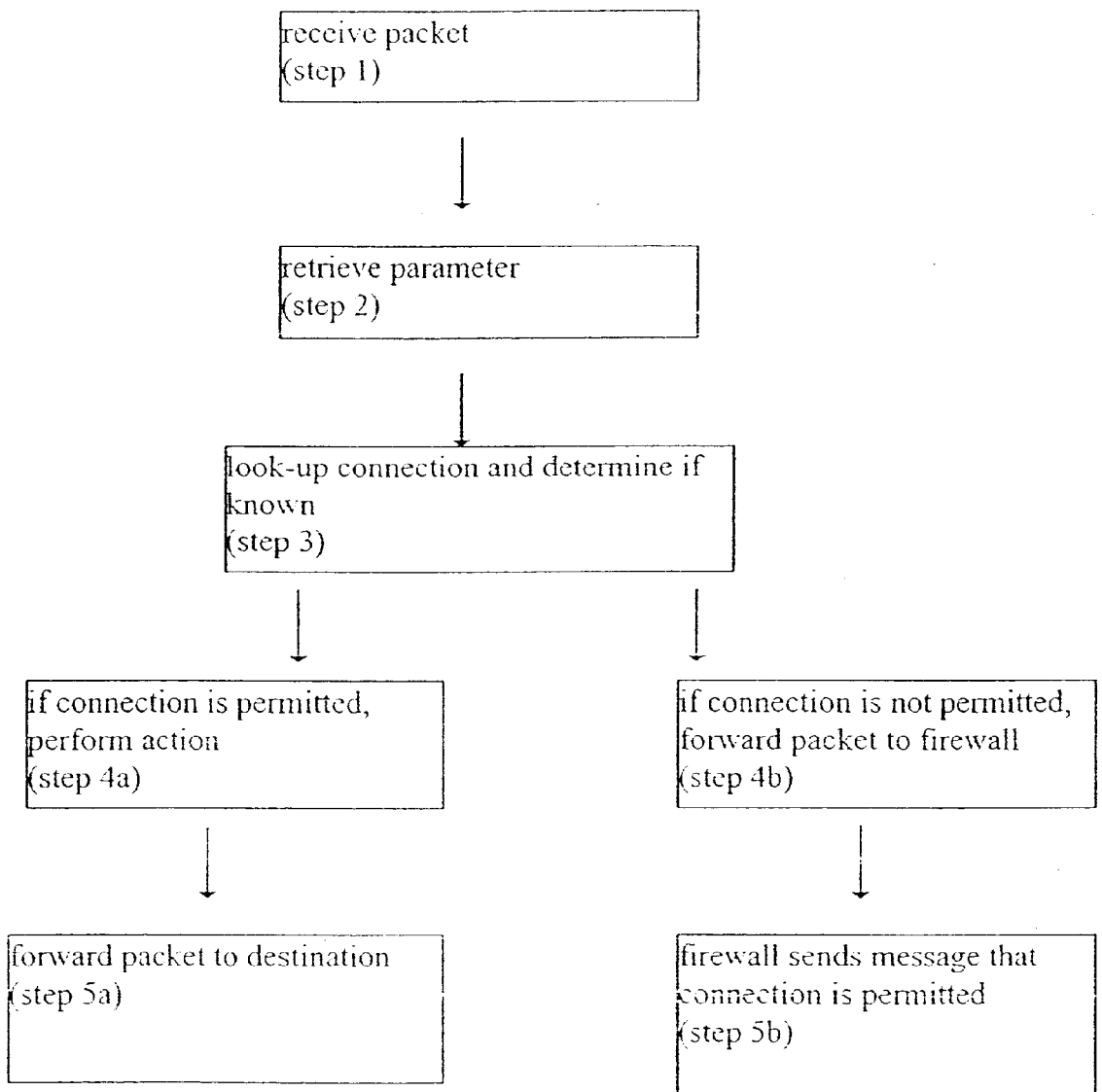
FIG. 3 is a flowchart of an exemplary method according to the present invention.

FIG. 3 is a flowchart of an exemplary method for operating the present invention. In step 1, a packet is received by the pre-filtering module. In step 2, at least one parameter of the packet is retrieved by the pre-filtering module. In step 3, the at least one parameter is used for examining the known connections, preferably by performing a look-up in a table of such known connections.

In step 4a, if an entry is found for the packet, then the action or actions defined for this connection are performed by the pre-filtering module. In step 5a, the packet is forwarded to its destination. Steps 4a and 5a are not performed if the packet has certain session-control field values, such as a set SYN/FIN/RST flag for a packet transmitted over an IP network, in which case the packet is preferably forwarded to the firewall for handling. Such session-control field values are indicative of packets which carry information about the connection state, and are therefore important for the firewall to receive and analyze, in order to determine the state of the connection.

Optionally, fragmented packets are also forwarded to the firewall if the pre-filtering module is not able to perform certain functions, such as virtual defragmentation for the preferred embodiment of the present invention with IP networks, and in particular with TCP/IP traffic. Virtual defragmentation is performed after an IP packet has become too large to be transmitted, and is therefore divided into a plurality of smaller packets, called fragments. Virtual defragmentation is the process by which all of the received fragments are reassembled into the original big packet.

In order to prevent various sorts of attacks which may be attempted with fragments, preferably the pre-filtering module of the present invention, but alternatively the firewall, drops duplicate packet fragments. In other words, if a previously received fragment is received again, that fragment is dropped.

Turning again to the flowchart of FIG. 3, alternatively, in step 4b, if an entry for the packet is not found in the table of connections, then the packet is forwarded to the firewall for handling. In step 5b, if the firewall determines that the connection to which the packet belongs is permitted, then the firewall optionally sends a message to the pre-filtering module with the necessary information concerning the new connection. Such a message preferably includes a key for identifying the new connection, information concerning address translation and optionally information concerning encryption, both of which are processes which involve the modification of the packet itself. The key for identifying the new connection preferably includes such information as the source IP address and port, the destination IP address and port, the protocol field and optionally the interface(s) from which a packet is expected to be received, for anti-spoofing protection. The address translation information includes the translated source IP address and port, the destination IP address and port.

According to preferred embodiments of the present invention, once the firewall has sent this message to the pre-filtering module, the connection is "offloaded" to the pre-filtering module, such that the firewall no longer receives any packets for this connection. Preferably, the firewall does not receive any further packets until a packet with certain session-control field values is received for this connection, indicating that the session is finished. For example, for IP networks, such values include having a set FIN/RST flag.

More preferably, a timeout occurs when no packet has been received for a particular connection within a certain period of time. Since the firewall does not see any packets for the offloaded connection, the firewall queries the pre-filtering module about the last time that a packet was received for the connection. According to the received response, the firewall determines whether to keep or delete the connection. If the firewall deletes the connection, the connection is preferably deleted from the tables of the pre-filtering module.

According to other preferred embodiments of the present invention, the firewall receives updated accounting information from the pre-filtering module at regular intervals. This information is optionally and preferably pushed to the firewall by the pre-filtering module, rather than by having the firewall poll the pre-filtering module. The accounting information preferably includes the number of packets and of bytes which have been received by the pre-filtering module for a particular connection since the last time that the accounting information was updated, and the last time that a packet was received by the pre-filtering module for this particular connection. This information is then reset within the pre-filtering module. Optionally and more preferably, if the pre-filtering module deletes the connection, then the pre-filtering module pushes the last accounting information about this connection to the firewall.

It will be appreciated that the above descriptions are intended only to serve as examples, and that many other embodiments are possible within the spirit and the scope of the present invention.

What is claimed is:

1. A system for accelerated packet filtering, the system comprising:
    (a) a source node for transmitting a packet;
    (b) a destination node for receiving said packet;
    (c) a firewall interposed between said source node and said destination node for performing packet filtering according to at least one rule; and
    (d) a pre-filtering module separate from said firewall and being in communication with said firewall, for receiving at least one instruction from said firewall and for receiving said packet before said firewall, such that if said packet is permitted according to said at least one instruction, said pre-filtering module handles said packet, and alternatively said pre-filtering module forwards said packet to said firewall for handling.

2. The system of claim 1, wherein packet transmission between said source node and said destination node forms a connection, and said firewall determines whether said connection is permitted, such that said at least one instruction includes at least one parameter of said packet for identifying a permitted connection, such that if said connection is permitted, said pre-filtering module handles said packet.

3. The system of claim 2, wherein said firewall receives a packet from said permitted connection from said pre-filtering module if said packet has a selected session-control field value.

4. The system of claim 2, wherein said at least one parameter for identifying said permitted connection includes a source address and a destination address for said packet.

5. The system of claim 4, wherein said at least one parameter for identifying said permitted connection further includes a source port and a destination port for said packet.

6. The system of claim 2, wherein if an additional packet has not been received for said permitted connection after a predefined period of time, said connection is deleted by said firewall.

7. The system of claim 2, wherein if a packet with a particular session-control field value indicative of information about a connection state is received for said permitted connection, said packet is forwarded to said firewall.

8. The system of claim 2, wherein said pre-filtering module further comprises:
(i) a connection database for storing said at least one parameter of said packet for identifying said permitted connection.

9. The system of claim 8, wherein said pre-filtering module further comprises:
(ii) a classification engine for analyzing at least a portion of said packet and for comparing said at least a portion of said packet to said at least one parameter.

10. The system of claim 9, wherein said pre-filtering module further comprises:
(iii) a modifier for performing at least one action on said packet if said packet is received from said permitted connection, said at least one action being defined according to an instruction from said firewall.

11. The system of claim 10, wherein said pre-filtering module is implemented as a hardware device.

12. The system of claim 10, further comprising:
(e) a computational device interposed between said source node and said destination node, wherein said pre-filtering module and said firewall are operated by said computational device.

13. A system for accelerated filtering of a packet on a network, the system comprising:
(a) a firewall located on the network for performing packet filtering on the packet according to at least one rule; and
(b) a pre-filtering module, separate from said firewall, located on the network and in communication with said firewall, for receiving at least one instruction from said firewall, said at least one instruction determining a simple comparison, and for receiving a packet transmitted on the network before said firewall, such that if the packet is permitted according to said simple comparison, said pre-filtering module at least transmits the packet on the network.

14. The system of claim 13, wherein if the packet is not permitted, said pre-filtering module either forwards the packet to said firewall for handling if the packet is received from the network, and alternatively drops the packet if the packet is received from said firewall.

15. The system of claim 13, further comprising:
(c) a source node for transmitting the packet; and
(d) a destination node for receiving the packet;
wherein packet transmission between said source node and said destination node forms a connection, and said firewall determines whether said connection is permitted, such that said at least one instruction includes at least one parameter of the packet for identifying a permitted connection, such that if said connection is permitted, said pre-filtering module at least transmits the packet on the network.

16. The system of claim 15, wherein if said connection is not a permitted connection, said pre-filtering module drops the packet.

17. For use in a system for accelerated packet filtration, the system featuring a network for transmitting a packet and a firewall on the network for filtering the packet, a pre-filtering module for receiving the packet before the firewall, the pre-filtering module comprising:
(a) a memory for storing at least one instruction for analyzing at least one parameter of the packet from the firewall, said at least one instruction including said at least one parameter for identifying the packet; and
(b) a classification engine for analyzing at least a portion of the packet and for comparing said at least a portion of the packet to said at least one parameter according to said at least one instruction.

18. The pre-filtering module of claim 17, further comprising:
(c) a modifier for performing at least one action on the packet if the packet is permitted, said at least one action being declined according to said at least one instruction from the firewall.

19. A method for accelerated packet filtering on a network in conjunction with a firewall, the method comprising the steps of:
(a) providing a pre-filtering module for receiving a packet before the firewall;
(b) receiving said packet by said pre-filtering module;
(c) determining whether said packet is permitted; and
(d) if said packet is permitted, handling said packet by said pre-filtering module.

20. The method of claim 19, further comprising the step of:
(e) alternatively, forwarding said packet to the firewall.

21. The method of claim 20, wherein step (e) is performed if said packet is received from the network.

22. The method of claim 21, wherein if said packet is received from the firewall, dropping said packet.

23. The method of claim 19, wherein step (d) includes the step of marking said packet with a priority number.

24. The method of claim 19, wherein if the packet is received as a plurality of fragments, step (d) includes the step of determining if a fragment is a duplicate fragment, such that if said fragment is a duplicate fragment, the method further comprises the step of:
(e) dropping said duplicate fragment.

25. The method of claim 19, wherein step (c) is determined according to at least one instruction received from the firewall.

26. The method of claim 25, wherein said packet has a destination address and wherein step (d) includes the step of forwarding said packet to said destination address.

27. The method of claim 26, wherein step (d) includes the step of performing at least one action on said packet by said pre-filtering module, said at least one action being determined according to an instruction from the firewall.

28. The method of claim 25, wherein said packet features at least one parameter, and said at least one instruction identifies said packet as a permitted packet according to said at least one parameter, such that step (c) includes the step of analyzing said packet to retrieve said at least one parameter.

29. The method of claim 28, wherein the firewall classifies at least one previously received packet according to at least a source address and a destination address of said at least one previously received packet, said source address and said destination address together forming a connection, such that the firewall sends said source address and said destination address for identifying said connection as a permitted connection to said pre-filtering module as said at least one instruction.

30. The method of claim 29, wherein the network communicates with a plurality of interfaces, and pre-filtering module is connected to each of said plurality of interfaces, such that step (c) includes the step of determining whether said packet is received from said permitted connection and from a permitted interface, such that said packet is permitted only if said packet is received from said permitted connection through said permitted interface.

* * * * *

UNITED STATES PATENT AND TRADEMARK OFFICE
CERTIFICATE OF CORRECTION

PATENT NO.   : 6,496,935 B1
DATED        : December 17, 2002
INVENTOR(S)  : Fink, Harush It is certified that error appears in the above-identified patent and that said Letters Patent is hereby corrected as shown below:

Column 12,
Line 26, the second word appears as "declined" instead of -- defined --

Column 13,
Line 9, the word "said" was omitted between "and ...pre-filtering".

Signed and Sealed this

Third Day of June, 2003

JAMES E. ROGAN
*Director of the United States Patent and Trademark Office*